3,660,498
PENTOL DERIVATIVES
Alberto Rossi, Oberwil, Switzerland, assignor to Ciba Corporation, Summit, N.J.
No Drawing. Filed June 27, 1969, Ser. No. 837,316
Claims priority, application Switzerland, July 5, 1968, 10,065/68
Int. Cl. C07c 43/20
U.S. Cl. 260—611 A                                10 Claims

ABSTRACT OF THE DISCLOSURE

D-arabitol compounds of formula

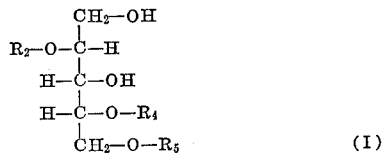

wherein each of the residues $R_2$, $R_4$ and $R_5$ denotes an optionally substituted hydrocarbon residue, as well as O-acyl derivatives thereof show antiinflammatory effects.

SUMMARY OF THE DISCLOSURE

The present invention concerns pentol derivatives, more particularly D-arabitol compounds of formula

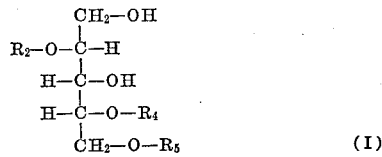

wherein each of the residues $R_2$, $R_4$ and $R_5$ denotes an optionally substituted hydrocarbon residue, as well as O-acyl derivatives thereof; or salts of compounds having salt-forming groups, process for their preparation and pharmaceutical preparations containing them. The compounds and especially the latter are useful as antiinflammatory agents, particularly in the treatment of exudative inflammatory reactions, i.e. those which are accompanied by an increased vascular permeability.

DESCRIPTION OF THE PREFERRED EMBODIMENTS

The above compounds possess the configuration of D-arabinose.

Residues, radicals or compounds subsequently qualified by the expression "lower" contain preferably up to 7, primarily up to 4, carbon atoms unless otherwise specified.

Optionally substituted hydrocarbon residues are above all organic residues of alcohols, especially optionally substituted aliphatic, alicyclic, alicyclic-aliphatic or more especially araliphatic hydrocarbon residues, but may also represent optionally substituted aromatic hydrocarbon residues.

Aliphatic hydrocarbon residues are, for example, lower aliphatic hydrocarbon residues, above all lower alkyl, as well as lower alkenyl or lower alkinyl.

Optional substituents of these residues, especially of lower alkyl, may above all be free or substituted amino groups, such as amino groups which are monosubstituted or disubstituted by lower alkyl, lower alkenyl, cycloalkyl or cycloalkenyl residues, as well as lower alkyleneamino, oxa-lower alkyleneamino or aza-lower alkyleneamino groups, free or functionally converted hydroxyl or mercapto groups, such as etherified or esterified hydroxyl or mercapto groups, for example, lower alkoxy groups or halogen atoms, as well as lower alkylmercapto groups, or free or functionally converted carboxyl groups, such as carbo-lower alkoxy, carbamyl or cyano groups, as well as heterocyclic residues, especially monocyclic heterocyclic residues of aromatic character, such as thienyl, furyl or pyridyl residues, these being optionally substituted like the aromatic residues referred to below. Optionally substituted aliphatic hydrocarbon residues, such as lower alkyl groups, may contain one, two or more of the same or different substituents, such as free or functionally converted hydroxyl groups, for example, lower alkoxy groups.

Alicyclic hydrocarbon residues, for example, contain up to 8 ring carbon atoms and above all represent corresponding cycloalkyl residues having, for example, 3–8, preferably 5–6, ring carbon atoms, as well as cycloalkenyl groups having, for example, 5–8, preferably 5–6, ring carbon atoms, these alicyclic groups being optionally mono-, di- or poly-substituted in the cycloaliphatic ring, for example, by lower alkyl residues.

Alicyclic-aliphatic hydrocarbon residues contain, for example, up to 8 ring carbon atoms and are above all corresponding cycloalkyl-lower alkyl groups, as well as cycloalkenyl-lower alkyl groups, which may optionally be mono-, di- or poly-substituted in the cycloaliphatic ring, for example, by lower alkyl residues.

Araliphatic hydrocarbon residues are especially monocyclic, as well as bicyclic, arylalkyl or arylalkenyl residues, above all phenyl-lower alkyl, as well as phenyl-lower alkenyl residues, especially benzyl residues, as well as phenylethyl, such as 1- or 2-phenylethyl residues, furthermore cinnamyl residues. They may optionally be monosubstituted, di-substituted or polysubstituted in the aromatic nucleus, for example, by lower alkyl groups, free, esterified or etherified hydroxyl or mercapto groups, for example, lower alkoxy or lower alkylenedioxy groups, as well as lower alkylmercapto groups, or halogen atoms and/or trifluoromethyl groups.

Aromatic hydrocarbon residues are, for example, monocyclic or bicyclic residues of such type, above all phenyl groups. They may be substituted, for example, like the aromatic nucleus of an araliphatic hydrocarbon residue.

Acyl residues of O-acyl derivatives especially represent residues of aliphatic carboxylic acids, such as fatty acids, above all lower alkanecarboxylic acids and lower alkanedicarboxylic acids, as well as carbonic acid or its half-esters, lower alkenecarboxylic acids, lower alkenedicarboxylic acids, higher alkanecarboxylic acids or higher alkenecarboxylic acids, as well as of alicyclic or alicyclic-aliphatic carboxylic acids, of araliphatic or aromatic carboxylic acids, which may optionally be substituted in the aromatic nucleus, for example, as described above or of sulphonic acids, such as benzenesulphonic acids, which may be optionally substituted in the aromatic nucleus, for example, as mentioned above.

Lower alkyl residues are, for example, methyl, ethyl, n-propyl, isopropyl, n-butyl, isobutyl, sec.-butyl, tert.-butyl, n-pentyl, isopentyl, neopentyl, n-hexyl, isohexyl, n-heptyl, or isoheptyl residues, while lower alkenyl residues represent, for example, allyl, methallyl or 2-butenyl residues, and lower alkinyl residues, for example, propargyl residues.

An amino group substituted by lower alkyl residues is, for example, a dimethylamino or diethylamino group, a lower alkyleneamino group, for example, a pyrrolidino or piperidino group, an oxa-lower alkyleneamino group, for example, a morpholino group, and an aza-lower alkyleneamino group, for example, a piperazino, such as a 4-methyl-1-piperazino group.

Lower alkoxy groups are, for example, methoxy, ethoxy, n-propyloxy, isopropyloxy, n-butyloxy, isobutyloxy, n-pentyloxy or n-hexyloxy groups, lower alkylenedioxy groups, for example, methylenedioxy groups.

Lower alkylmercapto groups are, for example, methylmercapto or ethylmercapto groups.

Halogen atoms are above all those having an atomic weight of 19 to 80, that is to say fluorine, chlorine or bromine atoms.

Carbo-lower alkoxy groups are, for example, carbomethoxy or carbethoxy groups, while carbamyl groups may optionally be N-monosubstituted or N,N-disubstituted and may represent, for example, N-methylcarbamyl, N-ethylcarbamyl or N,N-dimethylcarbamyl groups.

Pyridyl residues are, for example, 2-, 3- or 4-pyridyl groups, while thienyl and furyl residues represent above all 2-thienyl or 2-furyl groups.

In substituted aliphatic hydrocarbon residues, free or substitued amino groups or free or functionally converted hydroxyl or mercapto groups are, for example, separated by one, but preferably by more than one, carbon atom of the aliphatic hydrocarbon residue from the oxygen atom carrying such substituted aliphatic hydrocarbon residue.

Hydroxyl-substituted and lower alkoxy-substituted aliphatic hydrocarbon residues are above all hydroxy-lower alkyl or lower alkoxy-lower alkyl residues, in which the hydroxyl or lower alkoxy group are preferably separated by at least 2 carbon atoms from the oxygen atom which carries such a substituted aliphatic hydrocarbon residue, e.g. 2-hydroxyethyl, 2-hydroxypropyl, 3-hydroxypropyl, 2-methoxyethyl, 2-ethoxyethyl, 2-methoxypropyl, 3-methoxypropyl or 3-ethoxypropyl residues, but may also be hydroxymethyl, furthermore 2,3 - dihydroxypropyl residues.

Aliphatic hydrocarbon residues substituted by heterocyclic residues are, for example, thienyl-, furyl- or pyridyl-lower alkyl residues, such as thienyl, furfuryl or picolyl residues.

Cycloalkyl residues are, for example, cyclopropyl, cyclobutyl, cyclopentyl, cyclohexyl or cycloheptyl residues optionally mono-, di- or polysubstituted by lower alkyl groups, above all by methyl groups, while cycloalkenyl residues are 2- or 3-cyclopentenyl, 2- or 3-cyclohexenyl, or 2-, 3-, 4-cycloheptenyl residues optionally substituted in the same way.

Cycloalkyl-lower alkyl residues are, for example, cyclopentylmethyl, cyclopentylethyl or cyclohexylmethyl residues, while cycloalkenyl-lower alkyl residues, for example, represent 2- or 3-cyclohexenylmethyl residues, which may, for example, be mono-, di- or polysubstituted by lower alkyl groups, above all by methyl groups.

Substituted phenyl residues preferably contain a substituent in the 4-position; in the case of multiple substitution, identical or different substituents may be present.

In substituted araliphatic hydrocarbon residues, especially in benzyl residues, identical or different substituents may be present in the aromatic nucleus in the case of multiple substitution; a substituted phenyl-lower alkyl group, especially a benzyl group, preferably contains a substituent in the 4-position of the ring.

A lower alkanecarboxylic acid is, for example, formic-acetic, propionic or butyric acid. A lower alkanedicarboxylic acid contains, for example, 2–7, preferably 3–6, carbon atoms and is, for example, malonic, 2-methylsuccinic, glutaric, 3 - methylglutaric, 3 - ethylglutaric, adipic or pimelic acid, above all succinic acid. A carbonic acid half-ester, is, for example, a carbonic acid lower alkyl half ester, such as carbonic acid ethyl half ester. A lower alkenedicarboxylic acid contains, for example, 4–7 carbon atoms and is, for example, maleic or fumaric acid. An alicyclic carboxylic acid is, for example, cyclopentanecarboxylic acid, while an araliphatic carboxylic acid may, for example, be phenylacetic acid and an aromatic carboxylic acid, for example, benzoic acid, such acids being optionally substituted in the alicylic or aromatic nucleus, for example, as mentioned above. A benzenesulphonic acid is, for example a toluenesulphonic acid.

The compounds of the present invention possess valuable pharmacological properties. Thus, they show antiinflammatory effects which can be demonstrated in animal experiments, for example, those based on the turpentine pleuritis test of Spector, J. Path. Bact., vol. 72, p. 367 (1956), using experimental animals, such as rats, and administering the compounds intraperitoneally.

The new compounds are, therefore, useful as substances possessing antiinflammatory properties, especially anti-exudative and anti-oedematous effects. In contrast to glucofuranoside compounds having a similar spectrum of pharmacological activity, the semi-acetal grouping is missing in the present compounds; they are, therefore, distinguished by outstanding stability. It was furthermore found that the compounds of the present invention are usually obtained in a crystalline form. In contrast to the abovementioned glucofuranoside compound, which are normally obtained in an oily form and have to be purified by means of high vacuum distillation, the new compounds are, therefore, more completely purified according to easier and cheaper procedures and with smaller losses in yield, and can furthermore be processed into pharmacological preparations, such as tablets, for which glucofuranoside compounds of the type mentioned above are not suitable.

Particularly valuable compounds in respect of the pharmacological effects mentioned are D-arabitols of the above Formula I, as well as their acyl derivatives, especially lower alkanoyl, such as acetyl derivatives, as well as carboxylower alkanoyl, such as succinyl derivatives, in which each of the groups $R_2$, $R_4$ and $R_5$ represents a lower alkyl residue, e.g. methyl, ethyl, straight or branched propyl or butyl, a lower alkenyl, residue, for example, allyl, or a cycloalkyl residue, for example, cyclopentyl or cyclohexyl, and above all a benzyl residue, which may optionally be substituted, for example, as mentioned above, and $R_5$ may also be a phenyl residue, which may optionally be substituted, for example, as mentioned above, and salts, especially non-toxic salts, of such compounds having salt-forming groups.

Of this group of compounds there should especially be mentioned the 2-O-$R_2'$-4-O-$R_4'$-5-O-$R_5'$-D-arabitols, wherein $R_2'$ denotes a lower alkyl as well as lower alkenyl residue, or a benzyl residue optionally substituted, preferably in the 4-position, by halogeno, especially chloro, or lower alkyl, especially methyl, as well as lower alkoxy, especially methoxy, each of the residues $R_4'$ and $R_5'$ represents a benzyl residue optionally substituted, preferably in the 4-position, by halogeno, especially chloro, or lower alkyl, especially methyl, as well as lower alkoxy, especially methoxy, and $R_5'$ also represents a phenyl residue optionally substituted, preferably in the 4-position, by halogeno, especially chloro, or by lower alkyl, especially methyl, as well as lower alkoxy, especially methoxy, as well as their O-lower alkanoyl and O-carboxy-lower alkanoyl, such as O-succinyl, derivatives, as well as salts, especially the non-toxic alkali metal or ammonium salts, of such compounds with salt-forming groups.

Above all the 2,4,5-tri-O-benzyl-D-arabitol, as well as the 2,4-di-O-benzyl-5-O-phenyl-D-arabitol are to be noted, which in the above mentioned turpentine pleuritis test show excellent effects.

The compounds of the present invention are obtained according to per se known methods, for example, by reducing in a D-arabinose compound of formula

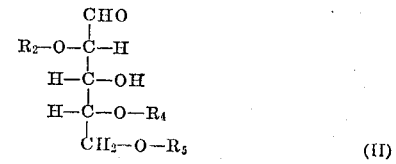

(II)

or in a 3-O-acyl derivative thereof the carbonyl group in the 1-position to the carbinol group, and, if desired, converting in a resulting compound an acyloxy group into a free hydroxyl group or a free hydroxyl group into an acyloxy group, and/or, if desired, converting a resulting compound having a salt-forming group into a salt or a resulting salt into the free compound.

3-O-acyl derivatives of the starting materials contain the above mentioned acyl residues, particularly those of organic, such as aliphatic carboxylic acids, for example, of lower alkane carboxylic acids, e.g. acetic and especially formic acid.

The above reduction can be carried out with any suitable carbonyl-carbinol reducing agent. In choosing the reducing agent it is, however, necessary to bear in mind that certain organic groups $R_2$, $R_4$ and/or $R_5$ may be hydrogenated simultaneously or hydrogenolytically split off; above all, this applies to aromatic residues, such as optionally substituted benzyl groups, as well as, for example, to halogeno-substituted organic residues.

Particularly suitable as reducing agents are hydride reducing agents, particularly optionally complex metal hydrides, such as alkali metal aluminium hydrides, for example, lithium aluminium hydride, as well as alkali metal tri-lower alkoxy-aluminium hydrides, for example, lithium tri-tert.-butyloxy-aluminium hydride, but above all borohydrides, such as diborane, and especially alkali metal and alkaline earth metal borohydrides, for example, sodium borohydride. These reducing agents are usually employed in the presence of diluents or mixtures of solvents, with aluminium hydride compounds preferably being used in the presence of solvents with ether groupings, for example, ether or tetrahydrofuran, and borohydride compounds in the presence of such solvents with ether groupings, among others also diethylene glycol dimethyl ether, as well as solvents with hydroxyl groupings, such as lower alkanols, for example, methanol, ethanol, isopropanol, n-butanol or tert.-butanol. The process is, if necessary, carried out with cooling or preferably with heating and/or in an inert gas, for example, a nitrogen atmosphere.

The reduction of the formyl group to the carbinol group can also be effected with hydrogen in the presence of a suitable catalyst, such as platinum oxide, preferably under mild conditions, the process being carried out in the presence of a suitable diluent or solvent mixture, if necessary, with cooling or warming and/or under pressure.

Under the conditions of the reduction reaction, particularly in an alkaline medium, a 3-O-acyl, particularly a 3-O-formyl group may be split off simultaneously.

The compounds of the present invention are also obtained by splitting off the group X from a compound of the formula

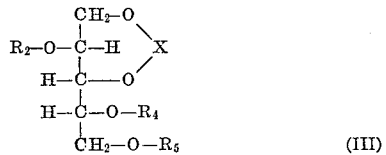

(III)

in which X represents an optionally substituted methylene group, and, if desired, carrying out the optional steps.

An optionally substituted methylene group X is an unsubstituted, more especially a monosubstituted or disubstituted methylene group. Substituents are in the first place optionally substituted monovalent or divalent aliphatic hydrocarbon residues, preferably lower alkyl, for example, ethyl, n-propyl, isopropyl or n-butyl, especially methyl residues, or lower alkylene radicals containing 4 to 6 chain carbon atoms, such as 1,4-butylene or 1,5-pentylene residues. If desired, these hydrocarbon residues may be substituted, for example, by lower alkyl, hydroxyl or lower alkoxy groups or halogen atoms, as well as by aromatic groups, such as phenyl radicals which themselves may be substituted, for example, by lower alkyl, hydroxyl or lower alkoxy groups or halogen atoms. Further substituents of the methylene group X may also be, for example, aromatic hydrocarbon residues optionally substituted, for example, as indicated above, such as phenyl groups, as well as free or functionally modified, such as esterified carboxyl groups, for example, carbo-lower alkoxy, e.g. carbomethoxy or carboethoxy groups. A substituted methylene group X is above all the isopropylidene group and in the first place a benzylidene group optionally substituted in the aromatic ring as mentioned above.

The cleavage of the group X is preferably carried out by treatment with an acid, in the presence of water. Acids are generally Lewis acids, preferably mineral acids, for example, sulphuric acid, or especially hydrohalic acids, in the first place hydrochloric acid, as well as organic acids, such as organic carboxylic acids, in the first place lower alkane carboxylic or dicarboxylic acids, particularly acetic acid, also formic or oxalic acid, furthermore organic sulphonic acids, for example, p-toluenesulphonic acid, or, if desired, mixtures of acids, for example, acetic acid in admixture with hydrochloric acid or p-toluenesulphonic acid, as well as salts with the characteristics of Lewis acids.

The reaction may be performed in a heterogeneous or homogeneous phase and can, if desired, be accelerated by adding a catalyst, such as a catalytic amount of phosphoric acid. Preferentially, it is performed in the presence of a diluent (for which purpose an acid reagent, e.g. acetic acid, may in general also be used as diluent), if necessary, with cooling, in the first place, however, at room temperature or at an elevated temperature (for example, at about 25° C. to above 150° C.), and/or under increased pressure and/or in an inert gas, such as nitrogen.

In compounds obtainable according to the invention having a 3-O-acyl grouping, the acyl group can be replaced by hydrogen, for example, by treatment with an alkaline reagent, such as an alkaline earth metal or alkali metal hydroxide or carbonate, or silver oxide, in an aqueous or alcoholic medium; as mentioned above, this cleavage may take place under the reaction conditions.

In compounds having free hydroxyl groups, the latter may be acylated by treatment with acylating agents capable of introducing the acyl residue of an organic acid, in a manner which is in itself known. Acylating agents used for this purpose are suitable acid derivatives (in the case of dicarboxylic acids, for example, their monoacid derivatives), especially anhydrides (also inner anhydrides, i.e. the corresponding ketenes), as well as halides, especially chlorides. The preferred procedure is to effect the reaction with anhydrides, such as, for example, acetic acid anhydride or succinic acid anhydride, in the presence of acidic or basic condensing reagents, for example, pyridine. The reaction with acid halides, for example, a chloride, such as acetic acid chloride or succinic acid monochloride, can be carried out in the presence of acid-binding condensation agents, such as tertiary bases or sodium acetate. A free hydroxyl group can also be esterified by means of carboxylic acids in the presence of suitable condensing reagents, such as carbodiimides or thiocarbodiimides, for example, dicyclohexylcarbodiimide, or with reactive esters of carboxylic acids, such as esters with N-hydroxyamino or N-hydroxyimino compounds, for example, N-hydroxysuccinimide.

Compounds having an acyl residue with salt-forming groups, such as, for example, free carboxyl groups may, depending on the reaction conditions, be obtained in the free form or in the form of salts; these forms may be converted into one another in a manner which is in itself known. Salts of compounds having a free carboxyl group are, for example, metal salts, especially alkali metal salts, for example, sodium or potassium salts, as well as alkaline earth metal salts, for example, magnesium or calcium salts, or ammonium salts, for example, salts with ammonia or with organic bases, such as trialkylamines, for example, trimethylamine or triethylamine, especially the non-toxic, pharmaceutically acceptable salts of the above nature. Such salts, especially the alkali metal salts of the new compounds, are distinguished by good solubility in water. Salts may also serve as intermediates for the purification of the corresponding free compounds. They are, for example, obtained by treating the free compounds with metal hydroxides or carbonates or with ammonia or amines, as well as with suitable ion exchangers.

Compounds having basic groups can be converted in a manner which is in itself known into their salts with acids, especially with those acids which form non-toxic, pharmaceutically acceptable salts, with inorganic or organic acids, such as hydrohalic acids, for example, hydrochloric or hydrobromic acid, sulphuric acid, phosphoric acid, nitric acid or perchloric acid, as well as aliphatic, alicyclic, aromatic or heterocyclic carboxylic or sulphonic acids, such as formic, acetic, propionic, oxalic, succinic, glycollic, lactic, malic, tartaric, citric, ascorbic, hydroxymaleic, dihydroxymaleic, pyruvic, phenylacetic, benzoic, p-aminobenzoic, anthranilic, p-hydroxybenzoic, salicylic, p-aminosalicylic, methanesulphonic, ethanesulphonic, hydroxyethanesulphonic, ethylenesulphonic, toluenesulphonic, naphthalenesulphonic or sulphanilic acid.

The resulting salts can be converted into the free compounds in the usual manner, salts with bases by treatment with acidic and salts with acids by treatment with alkaline reagents.

Because of the close relationships between the new compounds in the free form and in the form of their salts, reference in this context to a free compound or a salt is also intended to be a reference to the corresponding salt and free compound, respectively, provided such is possible or appropriate under the circumstances.

The procedures described above are carried out according to methods which are in themselves known, in the absence or preferably in the presence of diluents or solvents, if necessary with cooling or heating, in a closed vessel and/or in an inert gas, such as a nitrogen atmosphere.

The invention also relates to those embodiments of the process, according to which a compound obtainable as an intermediate at any stage of the process is used as the starting material and the remaining process steps are carried out or in which the process is interrupted at any stage, or a starting material is formed under the reaction conditions or used in the form of a reactive derivative thereof.

Those starting materials are preferably used which according to the process lead to those compounds indicated above as being particularly valuable.

The starting substances of Formula II are new; they represent a further subject of the present invention. Apart from being useful as intermediates, they also show antiinflammatory properties and are, therefore, useful as antiinflammatory agents. Such compounds are more especially those of the Formula II, as well as 3-O-acyl derivatives, in which each of the groups $R_2$, $R_4$ and $R_5$ is lower alkyl, lower alkenyl, cycloalkyl and above all benzyl, which may optionally be substituted as indicated above, and $R_5$ may also be phenyl optionally substituted as mentioned above, and salts of such compounds having salt-forming groups. There should be especially mentioned the 2-O-$R_2$'-4-O-$R_4$'-5-O-$R_5$'-D-arabinoses, in which $R_2$', $R_4$' and $R_5$' have the previously given meaning, as well as their 3 - O - lower alkanoyl or 3 - O - carboxy-lower alkanoyl derivatives, or salts of such compounds having salt-forming groups, and primarily the 2,4,5-tri-O-benzyl-D-arabinose, as well as the 2,4-di-O-benzyl-5-O-phenyl-D-arabinose and their 3-O-formyl derivatives. These starting materials are preferably obtained, when a D-glucofuranose of formula

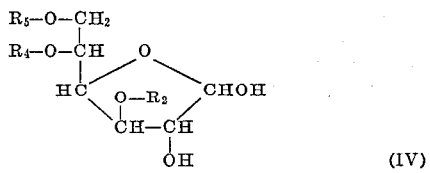

(IV)

is treated with a glycol-splitting oxidizing reagent, and, if desired, in a resulting compound a formyloxy group is converted into a free hydroxyl group or a free hydroxyl group is converted into an acyloxy group.

Suitable oxidizing reagents are above all periodic acid or salts thereof, especially alkali metal, such as sodium, periodates, as well as certain oxidative heavy metal carboxylates, such as thallium-III or preferably lead-IV carboxylates, such as lead-IV-lower alkanoates, above all lead tetraacetate, as well as lead tetrabenzoate. These oxidizing agents are preferably used in the presence of suitable organic carboxylic acids, such as acetic acid; these reagents may simultaneously serve as diluents. The process is, if necessary, carried out with cooling or heating. In a resulting compound a formyloxy group is converted into the free hydroxy group and a free hydroxy group is converted into an acyloxy group according to the procedure mentioned above.

The D-glucofuranose compounds of Formula IV used as intermediates are known or can, in case they are new, be manufactured in a manner which is in itself known. Thus, they are, for example, obtained by shielding the hydroxyl groups in positions 1 and 2 and, if desired, in positions 5 and 6 in a D-glucofuranose by introducing protective groups, for example, an unsubstituted or a mono- or disubstituted methylene group such as the isopropylidene or a benzylidene group. The hydroxyl group in the 3-position can then be etherified by treatment with a reactive ester of a compound of formula $R_2$—OH, such as, for example, an appropriate $R_2$-halide, for example, $R_2$-chloride or $R_2$-bromide, as well as an appropriate $R_2$-sulphonyloxy compound, in the presence of a basic reagent, such as an alkali metal hydroxide, for example, sodium or potassium hydroxide, or an alkali metal carbonate, for example, sodium or potassium carbonate, and a suitable solvent, such as dioxan or dimethylsulphoxide. Under suitable conditions, for example, in the presence of silver oxide or an alkali metal carbonate, for example, potassium carbonate. This etherification with a reactive ester of a compound of formula $R_2$—OH can also be carried out on the 3,5,6-trihydroxy compound without the hydroxyl groups in the 5- and 6-positions being etherified at the same time. It is of course possible to etherify all three hydroxyl groups in the 3,5,6-trihydroxy compound simultaneously.

In an intermediate product obtainable according to the above procedure hvaing protected hydroxyl groups in the 5- and 6-position, the latter may be liberated selectively, that is to say without liberating the protected hydroxyl groups in the 1- and 2-position, for example, by treatment with an acid, such as 60% aqueous acetic acid (for example, at 35°) or with aqueous ethanolic hydrochloric acid, and can then in turn be etherified by organic residues, for example, by using reactive esterified, optionally substituted alcohols, such as the corresponding halides, for example, chlorides or bromides, as well as sulphonyloxy compounds, for example, p-toluenesulphonyloxy compounds, in the presence of basic reagents, such as an alkali metal hydroxide, for example potassium hydroxide. This step can also be carried out in stages, in that the primary hydroxyl group in the 6-position can be etherified before the hydroxyl group in the 5-position, for example, on treatment with an approximately equivalent quantity of a reactive ester of the compound of formula $R_5$—OH in the presence of an approximately equivalent quantity of an alkali metal hydroxide or in the presence of silver oxide.

It is also possible to selectively esterify the 6-hydroxyl group in 5,6-dihydroxy compound, which contains an etherified hydroxyl group in the 3-position, for example, by treatment with a suitable organic sulphonic acid halide such as p-toluenesulphonyl chloride, and to form the 5,6-epoxy compound by treatment with a suitable basic reagent, such as an alkali metal lower alkoxide, e.g. sodium ethoxide. On decomposing the epoxide by means of an alcohol of formula $R_5$—OH in the presence of a trans-esterification catalyst, for example, an alkali metal compound, such as a sodium compound, of an alcohol of formula $R_5$—OH, or of a phenol of the formula $R_5$—OH, is necessary, in the presence of a base, e.g. pyridine, and preferably at an elevated temperature, the 5-hydroxy-6-$R_5$—O-compound is obtained; the free hydroxyl group in the 5-position of this compound can be etherified selectively, e.g. by treatment with a reactive ester of a compound of formula $R_4$—OH in the presence of a basic reagent, for example, as described above.

In the starting substances obtainable according to the abovementioned procedures, the protective group for the two hydroxyl groups in 1 and 2-position can, for example, be split off by treatment with a Lewis acid, especially an inorganic acid, for example, hydrochloric acid or sulphuric acid, as well as phosphoric acid, and also with an organic carboxylic acid, such as formic acid or oxalic acid, in an aqueous medium, with an organic solvent, such as acetic acid being optionally used at the same time and the process being, if desired, carried out with cooling or preferably with warming, if necessary, in a closed vessel and/or in an inert gas atmosphere.

The starting materials of the Formula III may be obtained, for example, by esterifying in a D-glucofuranose, in which the hydroxy groups in 1- or 2-positions are protected, for example, by a group X and in which the hydroxy group in 3-position is etherified, the hydroxy groups in 5- and 6-position, for example, by treatment with a reactive derivative of an organic carboxylic acid, such as a halide, e.g. chloride, particularly a corresponding derivative of a lower alkane carboxylic acid, e.g. acetic acid or of an aromatic carboxylic acid, e.g. benzoic acid, and liberating in a resulting compound the hydroxy groups in 1- and 2-position selectively, for example, by treatment with acetic acid in an aqueous medium, if necessary, in the presence of a strong acid, such as phosphoric acid. The resulting D-glucofuranose with an esterified hydroxyl group in 3-position and esterified hydroxyl groups in 5- and 6-positions may also be obtained by splitting off the protecting grouping, for example, the group X, of the 1- and 2-hydroxy group by treatment with a hydrogen halide, e.g. hydrogen chloride, in the presence of an alcohol, such as a lower alkanol, e.g. ethanol, and converting the resulting D-glucofuranoside, such as lower alkyl-D-glucofuranoside, with the etherified hydroxy group in 3-position and the esterified hydroxy groups in 5- and 6-position into the corresponding D-glucofuranose by treatment with about 50% aqueous acetic acid at about 60° C.

A D-glucofuranose with an etherified hydroxy group in 3-position and esterified hydroxy groups in 5- and 6-position is then degradated oxidatively as shown above, for example, by treatment with periodic acid or a salt thereof, such as sodium periodate, into a D-arabinose, in which the hydroxy group in 2-position is etherified and the hydroxy groups in 4- and 5-position are esterified, and which may contain in 3-position a hydroxy group acylated by a formyl group, which may be liberated under the reaction conditions. The resulting D-arabinose is then reduced to the corresponding D-arabitol according to the above procedure, e.g. by treatment with sodium borohydride, the optionally substituted methylene grouping of the formula —X— is then introduced into the 1,3-O-position, for example, by treatment with a ketone or an aldehyde, such as benzaldehyde, preferably in the presence of a suitable acidic condensing reagent, such as zinc-II-chloride, and in the resulting D-arabitol compound, in which the hydroxy groups in 1- and 3-position are bridged by the grouping of the formula —X—, with the etherified hydroxy group in 2-position and the esterified hydroxy groups in 4- and 5-positions, the latter are liberated by treatment with a basic reagent, such as an alkali metal hydroxide, e.g. sodium or potassium hydroxide. The free hydroxyl groups in 4- and 5-positions are then etherified according to the previously described procedure, if necessary, step-wise.

The starting materials of the Formula III, particularly those, in which the hydroxy group in 5-position is etherified by an aromatic, such as a phenyl residue, may also be obtained, for example, by esterifying in a D-glucofuranose with protected hydroxy groups in 1- and 2-position and a hydroxyl group in 6-position etherified, for example, by an aromatic residue, the hydroxy groups in 3- and 5-positions, for example, by introducing benzoyl residues, liberating the hydroxyl groups in 1- and 2-position, for example, directly or step-wise as described above, and oxidatively degradating the resulting D-glucofuranose with the esterified hydroxyl groups in 3- and 5-positions, and the etherified hydroxyl group in 6-position to form the corresponding D-arabinose, which is reductively converted into the D-arabitol. In the latter, the two hydroxyl groups in 1- and 3-position are protected by introducing the group of the formula —X—, particularly of a benzylidene group, according to the above mentioned procedure, the esterified hydroxyl groups in 3- and 5-positions are liberated by treatment with a basic reagent and as usually etherified by treatment with a reactive ester of an alcohol in the presence of a basic reagent; the resulting D-arabitol compound contains the hydroxy groups in 1- and 3-positions, protected by the group of the formula —X—, and the etherified hydroxyl groups in the 2-, 4- and 5-positions of the starting materials of the Formula III.

The new compounds or salts thereof may be employed as medicines, for example, in the form of pharmaceutical preparations, in which they are present mixed with a pharmaceutical organic or inorganic solid or liquid excipient suitable for administration, for example, for enteral or parenteral as well as topical administration. Suitable substances for forming the preparations are those which are inert towards the new compounds, such as water, gelatine, sugars, for example, lactose, glucose or fructose, starches, such as corn, wheat or rice starch, stearic acid or salts thereof, such as calcium or magnesium stearate, talc, vegetable oils, benzyl alcohols, gum, polyalkylene glycols, propylene glycol or other known medicinal excipients. The pharmaceutical preparations may, for example, be in the form of tablets, dragees or capsules, or in a liquid form as solutions, suspensions or emulsions. They are optionally sterilised and/or contain auxiliary substances such as preservatives, stabilisers, wetting agents or emulsifiers, salts for regulating the osmotic pressure or buffers. They may also contain further therapeutically valuable substances. The preparations are formulated according to usual methods.

The invention is illustrated in the following examples; temperatures are given in degrees centigrade.

EXAMPLE 1

A solution of 26.3 g. of 2,4,5-tri-O-benzyl-3-O-formyl-D-arabinose in 50 ml. of methanol is added dropwise over the course of 30 minutes to a solution of 7.9 g. of sodium borohydride in 125 ml. of 20% aqueous methanol at 5°. The reaction mixture is allowed to continue to react for another 10 minutes and is then mixed with 50 ml. of water. The bulk of the methanol is distilled off under reduced pressure at 40° and the residue is extracted with methylene chloride. The methylene chloride solution is washed with water, 2 N hydrochloric acid and again with water, dried over sodium sulphate and evaporated under reduced pressure. The residue is crystallised from a mixture of methylene chloride and petroleum ether; the 2,4,5-tri-O-benzyl-D-arabitol of formula

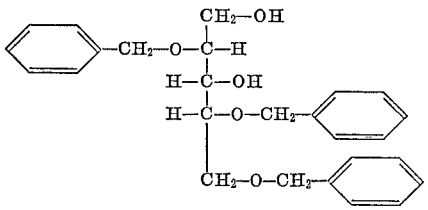

is obtained in the form of white crystals, M.P. 67–68.5°; $[\alpha]_D^{20} = -50° \pm 1°$ (c.=1.184 in chloroform).

The starting material used may be manufactured as follows:

A suspension of 500 g. of crude ethyl-3,5,6-tri-O-benzyl-D-glucofuranoside in 500 ml. of 50% aqueous acetic acid is warmed for 16 hours at an internal temperature of 70°, while stirring vigorously in a nitrogen atmosphere. The light yellow suspension is cooled to 30° and is then completely evaporated under reduced pressure at a bath temperature of 35°. The residue, obtained as a mobile syrup, is dissolved in 1200 ml. of toluene, washed with a saturated aqueous sodium hydrogen carbonate solution and with water until neutral and dried over magnesium sulphate. On adding 4200 ml. of hexane in portions, the 3,5,6-tri-O-benzyl-D-glucofuranose precipitates as a crystalline, almost colourless product; after recrystallisation at 0° from 2 parts by volume of a 1:1 mixture of ethanol and water, a completely colourless product is obtained, which melts at 68–71°; $[\alpha]_D^{20} = -30° \pm 1°$ (c.=1 in chloroform). According to a thin layer chromatogram on silica gel, the substance is uniform and shows Rf values of 0.18, 0.32 and 0.40 in the systems cyclohexane-acetone (70:30), chloroform-acetone (85:15) and chloroform-ethyl acetate (50:50), respectively.

The above intermediates can also be obtained as follows:

A suspension of 9.8 g. of 1,2,-O-isopropyidene-3,5,6-tri-O-benzyl-D-glucofuranose in a mixture of 65 ml. of glacial acetic acid and 35 ml. of 1 N aqueous sulphuric acid is warmed for 30 minutes at an internal temperature of 80° while vigorously stirring in nitrogen atmosphere. The light yellow, clear reaction solution is cooled to 10°, adjusted to pH 2–3 with 40 ml. of a 2 N aqueous sodium hydroxide solution and subsequently evaporated under reduced pressure at a bath temperature of 35°. The concentrate is dissolved in 100 ml. of chloroform, washed with a 1 N aqueous potassium hydrogen carbonate solution and with water until neutral, and dried over magnesium sulphate. The chloroform solution is evaporated under reduced pressure and the residue is completely freed of residual solvents by heating (bath temperature: 40°) in a high vacuum for 1 hour. The oily residue is dissolved in 40 ml. of ethyl acetate and crystallised by adding 480 ml. of hexane in portions; the colourless, 3,5,6-tri-O-benzyl-D-glucofuranose thus obtained melts at 68–70° C.

The intermediate can also be manufactured as follows:

A suspension of 10 g. of 1,2-O-isopropylidene-3,5,6-tri-O-benzyl-D-glucofuranose in 1000 ml. of 50% aqueous formic acid is stirred for 6 hours at 70° and is then extracted with toluene. The organic phase is washed with a saturated aqueous sodium hydrogen carbonate solution and with water until neutral, dried over sodium sulphate, filtered and adjusted to a volume of 100 ml. by adding toluene. After dilution with 100 ml. of petroleum ether (boiling point 60–90°) the solution is treated with 0.3 g. of active charcoal and the mixture is boiled for a few minutes under reflux and filtered hot. After cooling to 30°, the filtrate is diluted by adding a total of 500 ml. of petroleum ether in portions while stirring. The 3,5,6-tri-O-benzyl-D-glucofuranose precipitates in the form of colourless fine needles, the product being allowed to stand for some hours at 0° after completion of the addition, M.P. 64–66°.

A solution of 4000 ml. of 50% aqueous acetic acid containing 53 g. of 3,5,6-tri-O-benzyl-D-glucofuranose is mixed with a solution of 58.4 g. of periodic acid in 135 ml. of water at 20°. The reaction mixture is allowed to stand for 16 hours at 0–5° and the white crystalline precipitate is filtered off, washed with small amount of ice-water and dried in a water-pump vacuum at 60°; the resulting 2,4,5-tri-O-benzyl-3-O-formyl-D-arabinose melts at 78–79° and may be converted into the 2,4,5-tri-O-benzyl-D-arabinose by treatment with a base.

EXAMPLE 2

A solution of 13.2 g. of sodium borohydride in 180 ml. of 20% aqueous methanol is treated dropwise at 5°, over the course of 30 minutes, with a solution of 39.6 g. of 2-O-n-propyl-4,5-di-O-(4-chlorobenzyl)-D-arabinose in 100 ml. of methanol. After continuing to react for 2 hours at the same temperature, the reaction mixture is mixed with 40 ml. of water. The methanol is distilled off under reduced pressure at 40° and the residue is extracted with chloroform. The chloroform solution is washed with water, 2 N hydrochloric acid and again with water, dried over sodium sulphate and evaporated under reduced pressure. On treating the residue with a mixture of ether and petroleum ether, the 2-O-n-propyl-4,5-di-O-(4-chlorobenzyl)-D-arabitol of formula

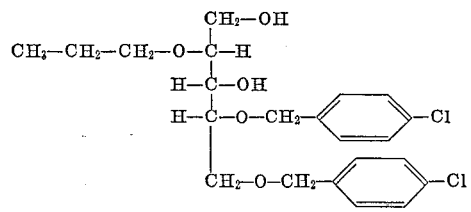

is obtained in the form of white crystals, M.P. 84–84.5°; $[\alpha]_D^{20} = -27° \pm 1°$ (c.=1.102 in chloroform).

The starting material is manufactured as follows:

A solution of 82 g. of 1,2-O-isopylidene-3-O-allyl-α-D-glucofuranose in 800 ml. of ethanol is hydrogenated in the presence of 1 g. of a 10% palladium-on-charcoal catalyst. The catalyst is filtered off, the filtrate is evaporated and the residue, containing the 1,2-O-isopropylidene-3-O-n-propyl-α-D-glucofuranose $[\alpha]_D^{20} = -49° \pm 1°$ (c.=1 in chloroform) is degassed in a high vacuum.

A solution of 32 g. of 1,2-O-isopropylidene-3-O-n-propyl-α-D-glucofuranose in 100 ml. of absolute dioxan is treated with 87.5 g. of powdered potassium hydroxide. A solution of 131 g. of 4-chlorobenzyl chloride in 50 ml. of absolute dioxan is then added dropwise over the course of 30 minutes while stirring; the mixture is then allowed to react for 5 hours at 80°. The excess 4-chlorobenzyl chloride is distilled off with steam and after cooling, the mixture is extracted with chloroform. The organic extract is washed with water, dried over sodium sulphate and evaporated under reduced pressure. On distilling the residue, the 1,2-O-isopropylidene-3-O-n-propyl-5,6-di-O-(4-chlorobenzyl)-α-D-glucofuranose is obtained as a pale yellow oil at 230°/4.015 mm. Hg; $[\alpha]_D^{20} = -22° \pm 1°$ (c.=1 in chloroform).

A suspension of 5 g. of 1,2-O-isopropylidene-3-O-n-propyl-5,6-di-O-(4-chlorobenzyl)-α-D-glucofuranose in a mixture of 35 ml. of glacial acetic acid and 17.5 ml. of 1 N aqueous sulphuric acid is warmed for 30 minutes at an internal temperature of 80° in a nitrogen atmosphere while vigorously stirring. The reaction mixture is cooled to 10°, adjusted to pH 2–3 with a 2 N aqueous sodium hydroxide solution, and subsequently evaporated at a bath temperature of 35°. The concentrate is extracted with ether and the organic phase is washed with a saturated aqueous sodium hydrogen carbonate solution and with water until neutral, dried over magnesium sulphate and evaporated. The residue corresponds to the 3-O-n-propyl- 5,6-di-O-(4 - chlorobenzyl)-D-glucofuranose, which in a thin layer chromatogram (silica gel) in the system chloroform:ethyl acetate (85:15) shows an R$f$-value of 0.12; M.P. 60° after recrystallisation from a 1:3 mixture of toluene and hexane, and cooling to −17°.

The 3-O-n-propyl-5,6-di-O-(4 - chlorobenzyl)D-glucofuranose can also be obtained by heating a mixture of 15 g. of ethyl-3-O-n-propyl-5,6-di-O-(4-chlorobenzyl)-D-glucofuranoside in 600 ml. of glacial acetic acid and 600 ml. of water for 16 hours at 70°, distilling off the excess acetic acid, extracting the aqueous residue with ether and working up the ether solution as described above.

A solution of 49.8 g. of 3-O-n-propyl-5,6-di-O-(4-chlorobenzyl)-D-glucofuranose in 2000 ml. of acetic acid is mixed with a solution of 52.5 g. of periodic acid in 400 ml. of water. The mixture is allowed to continue to react for 1 hour at room temperature and the solution is filtered. After adding 1600 ml. of water the filtrate is extracted with chloroform. The chloroform solution is washed with a saturated sodium hydrogen carbonate solution and with water and dried over sodium sulphate. On evaporating, the 2-O-n-propyl-4,5-di-O-(4 - chlorobenzyl)-D-arabinose is obtained and is used without further purification.

EXAMPLE 3

A mixture of 12 g. of 2-O-n-propyl-4,5-di-O-(4-chlorobenzyl)-D-arabitol in 12 ml. of pyridine and 12 ml. of acetic acid anhydride is allowed to stand for 16 hours and is then evaporated under reduced pressure. The residue is distilled and the 1,3-di-O-acetyl-2-O-n-propyl-4,5-di-O-(4-chlorobenzyl-D-arabitol of formula

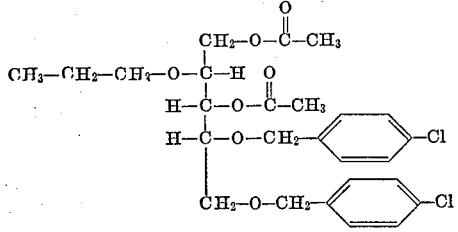

is obtained at 220–225°/0.01 mm. Hg; $[\alpha]_D^{20} = +21° \pm 1°$ (c.=1.214 in chloroform).

EXAMPLE 4

A solution of 5.45 g. of sodium borohydride in 30 ml. of cold water is added dropwise in the course of 15 minutes to a suspension of 19 g. of 2-O-methyl-3-O-formyl-4,5-di-O-(4-chlorobenzyl)-D-arabinose in 270 ml. of methanol at 10°. The batch is allowed to stand for 30 minutes and is then treated with 50 ml. of water. The bulk of the methanol is distilled off under reduced pressure at 40°, and the residue is extracted with methylene chloride. The methylene chloride extract is washed with water, 2 N hydrochloric acid, and again with water, dried over sodium sulfate, and evaporated under reduced pressure. The residue is crystallized from a mixture of methylene chloride and petroleum ether and 2-O-methyl-4,5-di-O-(4-chlorobenzyl)-D-arabitol of the formula

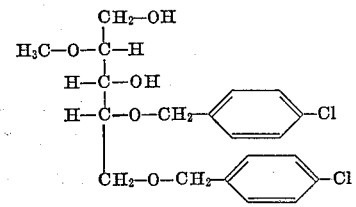

is obtained as white crystals, M.P. 82–82.5°; $[\alpha]_D^{20} = -20 \pm 1°$ (c.=1.046 in chloroform).

The starting material used can be obtained as follows:
A solution of 42 g. of 1,2-O-isopropylidene-3-O-methyl-α-D-glucofuranose in 150 ml. of absolute dioxan is mixed with 128 g. of powdered potassium hydroxide. In the course of 30 minutes, 192 g. of 4-chlorobenzyl chloride are added dropwise while stirring and the reaction mixture is allowed to react for 5 hours at 80°. The excess 4-chlorobenzyl chloride is distilled off with steam, the residue is allowed to cool and is then extracted with chloroform. The chloroform solution is dried over sodium sulfate and evaporated under reduced pressure. The residue is distilled and yields at 235°/0.02 mm. Hg the 1,2-O-isopropylidene-3-O-methyl-5,6-di-O-(4-chlorobenzyl)-α-D-glucofuranose as a faintly yellowish oil; $[\alpha]_D^{20} = -22° \pm 1°$ (c.=1 in chloroform).

A solution of 11 g. of 1,2-O-isopropylidene-3-O-methyl-5,6-di-O-(4-chlorobenzyl)-α-D-glucofuranose in 300 ml. of a 1 N solution of hydrogen chloride in ethanol is kept for 20 hours at room temperature and then neutralized at 0 to 5° with a 10 N aqueous sodium hydroxide solution. The bulk of ethanol is distilled off under reduced pressure and the residue is extracted with choroform; the chloroform extract is washed with an aqueous sodium bisulfite solution and with water, dried over sodium sulfate and evaporated under vaccum; the residue is distilled to yield at 190°/0.01 mm. Hg the ethyl-3-O-methyl-5,6-di-O-(4-chlorobenzyl)-D-glucofuranoside as a faintly yellowish oil; $[\alpha]_D^{20} = -14° \pm 1°$ (c.=1 in chloroform).

A solution of 68.6 g. of ethyl-3-O-methyl-5,6-di-O-(4-chlorobenzyl)-D-glucofuranoside in 600 ml. of 60% aqueous acetic acid containing 2 g. of calcium bromide is refluxed for 12 hours. The greater part of the acetic acid is then distilled off under reduced pressure, and the residue is extracted with ether. The ether solution is washed with a saturated sodium hydrogen carbonate solution and water, dried over sodium sulfate, and evaporated under reduced pressure. A solution of the residue in an 85:15 mixture of chloroform and ethyl acetate is filtered through a silica gel chromatography column. The 3-O-methyl-5,6-di-O-(4-chlorobenzyl) - D - glucofuranose is obtained as a yellowish oil, $[\alpha]_D^{20} = -12° \pm 1°$; thin-layer chromatogen R$f$=0.1 (silica gel; system chloroform-ethyl acetate 85:15).

A solution of 26.8 g. of 3-O-methyl-5,6-di-O-(4-chlorobenzyl)-D-glucofuranose in 800 ml. of 75% aqueous acetic acid is treated with a solution of 30 g. of periodic acid in 100 ml. of water at 20° C. After that, 400 ml. of water are added and the white crystalline precipitate which forms is filtered off, the filter residue is washed with a small amount of ice-water, and the filtrate dried in a water-jet vacuum at 50°; the resulting 2-O-methyl-3-O-formyl-4,5-di-O-(4-chlorobenzyl)-D-arabinose melts at 108–109.5°; $[\alpha]_D^{20} = +7° \pm 1°$ (c.=1.167 in chloroform).

EXAMPLE 5

A solution of 17.3 g. of 2,4-di-O-benzyl-3-O-formyl-5-O-phenyl-D-arabinose in 210 ml. of methanol is added dropwise to a solution of 5 g. of sodium borohydride in 90 ml. of 65% aqueous methanol at 5°. The reaction mixture is allowed to stand for 30 minutes and is then treated with 50 ml. of water. The greater part of the methanol is distilled off under reduced pressure at 40° and the residue neutralized with ice-cold 2 N hydrochloric acid. The mixture is extracted with methylene chloride and the organic solution is washed with 2 N hydrochloric acid and with water, dried over sodium sulfate and evaporated under reduced pressure. The residue is crystallized from a mixture of methylene chloride and petroleum ether; the 2,4-di-O-benzyl-5-O-phenyl-D-arabitol of the formula

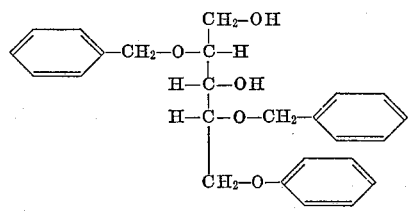

is obtained in the form of white crystals, M.P. 88–89° C.; $[\alpha]_D^{20} = -30° \pm 1°$ (c.=1.112 in chloroform).

The starting material used can be prepared as follows:

To a melt of 50 g. of 1,2-O-isopropylidene-5,6-anhydro-α-D-glucofuranose (1,2-O-isopropylidene - 5,6 - bis-desoxy-5,6-oxido-α-D-glucofuranose) and 23.5 g. of phenol, 3 drops of pyridine are added at 110°. The exothermic reaction which sets in is cooled in such manner that the temperature does not rise above 170°. The mixture is allowed to stand at 140° for 30 minutes, cooled to 80–90°, after which 100 ml. of methanol are added dropwise while stirring. The methanolic solution is evaporated and the residue is dissolved in ether. The ether solution is washed with an ice-cold 1 N aqueous sodium hydroxide solution and with water, dried over sodium sulfate, and evaporated under reduced pressure. The 1,2-O-isopropylidene-6-O-phenyl-α-D-glucofuranose obtained as residue is purified as follows:

A solution of 65 g. of crude 1,2-O-isopropylidene-6-O-phenyl-α-D-glucofuranose in 60 ml. of pyridine is treated with 60 ml. of acetic acid anhydride and allowed to stand at room temperature for 12 hours before the bulk of the pyridine and the acetic acid anhydride is distilled off at 50–60° under reduced pressure. The residue is mixed with 100 ml. of ice-water and extracted with ether. The ether solution is washed with ice-cold 1 N hydrochloric acid and with water, dried over sodium sulfate and evaporated under reduced pressure. The residue is crystallized from a mixture of methanol and water to yield the 1,2-O-isopropylidene-3,5-di-O-acetyl - 6 - O - phenyl-α-D-glucofuranose, M.P. 108°.

A suspension of 62.5 g. of 1,2-O-isopropylidene-3,5-di-O-acetyl-6-O-phenyl-α-D-glucofuranose in 200 ml. of methanol is mixed with a solution of 20.2 g. of potassium hydroxide in 466 ml. of methanol. The mixture is allowed to stand for 10 minutes and is then evaporated under reduced pressure. The residue is extracted with ether and the ether solution is washed neutral with water, dried over sodium sulfate and evaporated under reduced pressure. The residue is crystallized from a mixture of methanol and water to yield the 1,2-O-isopropylidene-6-O-phenyl-α-D-glucofuranose, M.P. 60–61°.

In an atmosphere of nitrogen, a solution of 90 g. of 1,2-O-isopropylidene-6-O-phenyl-α-D-glucofuranose in 60 ml. of dimethylsulfoxide is added dropwise while stirring vigorously to a suspension of 58.3 g. of powdered potassium hydroxide in 120 ml. of dimethylsulfoxide. In the course of 70 minutes, the mixture is treated dropwise at 40° with 115 g. of benzyl chloride. Stirring is continued at room temperature for 12 hours. The reaction mixture is then poured into 200 ml. of ice-water and the mixture is extracted with chloroform. The chloroform solution is washed neutral with water, dried over sodium sulfate and evaporated under a water-jet vacuum. The residue is mixed with 60 g. of potassium hydroxide and the mixture is subjected to steam distillation until chlorine can no longer be detected in the distillate. The residue is cooled and extracted with chloroform. The chloroform solution is washed with water and dried over sodium sulfate, then evaporated under reduced pressure. The resulting 1,2-O-isopropylidene-3,5-di-O-benzyl-6-O-phenyl-α-D-glucofuranose crystallizes from a mixture of methanol and water, M.P. 62.5–63.5°; $[\alpha]_D^{20} = -26° \pm 1°$ (c.= 1.03 in chloroform).

A solution of 96 g. of 1,2-O-isopropylidene-3,5-di-O-benzyl-6-O-phenyl-α-D-glucofuranose in 1500 ml. of 1 N ethanolic hydrogen chloride is allowed to stand at room temperature, then cooled to 0–5° and finally neutralized with an ice-cold 10 N aqueous sodium hydroxide solution. The resulting sodium chloride is filtered off and the bulk of the ethanol in the filtrate is expelled under reduced pressure at 40–45°. The residue is extracted with ether and the ether solution is washed with a saturated aqueous sodium hydrogen sulfite solution and with water, dried over sodium sulfate, and evaporated at 40° in a water-jet vacuum. On de-gassing of the residue in a high vacuum, ethyl-3,5-di-O-benzyl-6-O-phenyl-D-glucofuranoside is obtained; $[\alpha]_D^{20} = -18° \pm 1°$ (c.=0.91 in chloroform).

A solution of 24 g. of ethyl 3,5-di-O-benzyl-6-O-phenyl-D-glucofuranoside in 1800 ml. of 50% aqueous acetic acid is stirred at 70° during 6 hours. The main portion of the acetic acid is removed under reduced pressure and the residue is extracted with ether. The ether solution is washed with a saturated aqueous sodium hydrogen carbonate solution and with water, dried over sodium sulfate and evaporated under reduced pressure. The 3,5-di-O-benzyl-6-O-phenyl-D-glucofuranose crystallizes from a mixture of ether and hexane in the form of white crystals, M.P. 90–91°; $[\alpha]_D^{20} = -8° \pm 1°$ (c.=1.013 in chloroform).

A solution of 35.6 g. of 3,5-di-O-benzyl-6-O-phenyl-D-glucofuranose in 850 ml. of 65% aqueous acetic acid is mixed at 20° with a solution of 40.5 g. of periodic acid in 70 ml. of water. The mixture is allowed to stand for 5 minutes and then mixed with 700 ml. of water and extracted with ether. The ether solution is washed with a saturated aqueous sodium hydrogen carbonate solution and with water, dried over sodium sulfate, and evaporated in a water-jet vacuum at 40°. The residue is crystallized from a mixture of ether and hexane to yield the 2,4-di-O-benzyl-3-O-formyl-6-O-phenyl-D-arabinose in the form of white crystals, M.P. 52–54°; $[\alpha]_D^{20} = +8° \pm 1°$ (c.=1.096 in chloroform). The 2,4-di-O-benzyl-6-O-phenyl-D-arabinose is obtained from it by treatment with a base.

EXAMPLE 6

A solution of 5.2 g. of sodium borohydride in 190 ml. of 85% aqueous methanol is mixed with a suspension of 19 g. of 2,4-di-O-benzyl-3-O-formyl-5-O-(4-chlorophenyl)-D-arabinose in 210 ml. methanol at 0–5°. The mixture is allowed to stand at this temperature for 30 minutes and the methanol is then distilled off at 40° in a water-jet vacuum. The residue is neutralized with ice-cold 2 N hydrochloric acid and extracted with methylene chloride. The methylene chloride solution is washed with 2 N hydrochloric acid and with water, dried over sodium sulfate and evaporated under reduced pressure. The residue is crystallized from a mixture of methanol and water; the 2,4-di-O-benzyl-5-O-(4-chlorophenyl)-D-arabitol of the formula

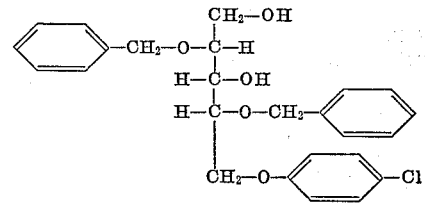

is obtained in the form of slightly brownish crystals, M.P. 88–89°; $[\alpha]_D^{20} = -30° \pm 1°$ (c.=1.073 in chloroform).

The starting material can be prepared as follows:

A melt of 50 g. of 1,2-O-isopropylidene-5,6-anhydro-α-D-glucofuranose and 38.5 g. of 4-chlorophenol is treated at 110° with 6 drops of pyridine. The mixture is allowed to react for another 30 minutes at 140° and is then cooled to 80–90°, and mixed with 100 ml. of methanol. The bulk of the methanol is then distilled off under reduced pressure, and the residue is extracted with ether. The ether solution is washed with an aqueous sodium hydroxide solution and with water, dried over sodium sulfate, and evaporated under a water-jet vacuum. The 1,2-O-isopropylidene-6-O-(4-chlorophenyl)-α-D-glucofuranose obtained as a residue is purified as follows:

A solution of 80.2 g. of the crude 1,2-O-isopropylidene-6-O-(4-chlorophenyl)-α-D-glucofuranose in 160 ml. of a 1:1-mixture of pyridine and acetic acid anhydride is kept at 90° for an hour and a half. The mixture is evaporated under reduced pressure, the residue is mixed with 100 ml. of ice-cold water, and the whole is extracted with ether. The ether solution is washed with 1 N hydrochloric acid and with water, dried over sodium sulfate and evaporated under reduced pressure. The 1,2-O-isopropylidene-3,5-di-O-acetyl-6-O-(4-chlorophenyl)-α-D - glucofuranose crystallizes from a mixture of methanol and water, M.P. 76–77.5°; $[\alpha]_D^{20}=13°\pm1°$ (c.=1.264 in chloroform).

A suspension of 76 g. of the resulting 1,2-O-isopropylidene-3,5-di-O-acetyl-6-O-(4-chlorophenyl)-α - D - glucofuranose in 200 ml. of methanol is mixed with a solution of 21.7 g. of potassium hydroxide in 450 ml. of methanol. The mixture is stirred at room temperature for 30 minutes and the bulk of the methanol is then distilled off under reduced pressure. The residue is extracted with ether and the ether solution is washed with water, dried over sodium sulfate, evaporated in a water-jet vacuum, and the residue is crystallized from a mixture of methanol and water. The resulting 1,2 - O - isopropylidene - 6 - O - (4-chlorophenyl)-α-D-glucofuranose melts at 103.5–104.5°; $[\alpha]_D^{20}=-6°\pm1°$ (c.=1.297 in chloroform).

In an atmosphere of nitrogen, a solution of 47 g. of 1,2 - O - isopropylidene-6-O-(4-chlorophenyl)-α-D-glucofuranose in 40 ml. of dimethylsulfoxide is added dropwise, while stirring vigorously, to a suspension of 28.8 g. of powdered potassium hydroxide in 50 ml. of dimethylsulfoxide. In the course of 70 minutes, 54 g. of benzyl chloride are added dropwise to this mixture. The mixture is stirred for 30 minutes, and the reaction product poured into 150 ml. of ice-water, and the whole is extracted with chloroform. The chloroform solution is washed with water, dried over sodium sulfate and evaporated under reduced pressure. The residue is mixed with 30 g. of powdered potassium hydroxide and the mixture is subjected to steam distillation until chlorine can no longer be detected in the distillate. The residue is extracted with chloroform and the chloroform solution is washed with water, dried over sodium sulfate, and evaporated in a water-jet vacuum. The residue is distilled; the 1,2-O-isopropylidene-3,5-di-O-benzyl - 6 - O-(4-chlorophenyl)-α-D-glucofuranose is obtained as a yellowish oil at 250–255°/0.01 mm. Hg; $[\alpha]_D^{20}=-24°\pm1°$ (c.=1.19 in chloroform).

A solution of 66.5 g. of 1,2-O-isopropylidene-3,5-di-O-benzyl-6-O-(4-chlorophenyl)-α-D-glucofuranose in 1000 ml. of 1 N ethanolic hydrogen chloride is allowed to stand at room temperature for 18 hours, then cooled to 0–5° and neutralized with a ice-cold 10 N aqueous sodium hydroxide solution. The resulting sodium chloride is filtered off and the filtrate is freed from the bulk of the ethanol at 40° under a water-jet vacuum. The residue is extracted with ether; the ether solution is washed with a saturated aqueous sodium hydrogen sulfite solution and with water, dried over sodium sulfate and evaporated at 40° under reduced pressure. The residue is crystallized from a mixture of ether and hexane to yield the ethyl-3,4-di-O-benzyl-6-(4-chlorophenyl)-D-glucofuranoside in the form of white crystals, M.P. 83.5–84.5°; $[\alpha]_D^{20}=-37°\pm1°$ (c.=1.089 in chloroform.)

A solution of 38.4 g. of ethyl-3,5-di-O-benzyl-6-(4-chlorophenyl)-D-glucofuranoside in 500 ml. of 50% aqueous acetic acid is refluxed for 12 hours and then freed from the bulk of the acetic acid under reduced pressure. The residue is extracted with ether and the ether solution is washed with a saturated aqueous sodium hydrogen carbonate solution and with water, dried over sodium sulfate and evaporated in a water-jet vacuum. The 3,5-di-O-benzyl - 6-O-(4-chlorophenyl)-D-glucofuranose is crystallized from a mixture of methylene chloride and hexane and obtained in the form of faintly yellowish crystals, M.P. 80–82°; $[\alpha]_D^{20}=0°\pm1°$ (c.=1.075 in chloroform).

A solution of 27 g. of 3,5-di-O-benzyl-6-O-(4-chlorophenyl)-D-glucofuranose in 800 ml. of 65% aqueous acetic acid is mixed at 20° with a solution of 28.4 g. of periodic acid in 70 ml. of water. After the addition of 530 ml. of water, the mixture is extracted with ether. The ether solution is washed with a saturated aqueous sodium hydrogen carbonate solution and with water, dried over sodium sulfate, and evaporated under reduced pressure. From a mixture of ether and hexane, the 2,4-di-O-benzyl-3-O-formyl-5-O-(4-chlorophenyl)-D-arabinose crystallizes in the form of white crystals, M.P. 59–61°; $[\alpha]_D^{20}=+6°\pm1°$ (c.=1.148 in chloroform).

EXAMPLE 7

A solution of 21.8 g. of 2,4-di-O-benzyl-3-O-formyl-5-O-(4-methoxyphenyl)-D-arabinose in 220 ml. of methanol is added dropwise in the course of 15 minutes at 10°, while stirring, to a solution of 6 g. of sodium borohydride in 180 ml. of 80% aqueous methanol. Stirring is continued for another 30 minutes, the bulk of the methanol is distilled off under reduced pressure, and the residue is neutralized with ice-cold 2 N hydrochloric acid. The mixture is extracted with ether and the ether solution is washed with 2 N hydrochloric acid and with water, dried over sodium sulfate and evaporated in a water-jet vacuum. The residue is crystallized from a mixture of ether and petroleum ether, and the 2,4-di-O-benzyl-5-O-(4-methoxyphenyl)-D-arabitol of the formula

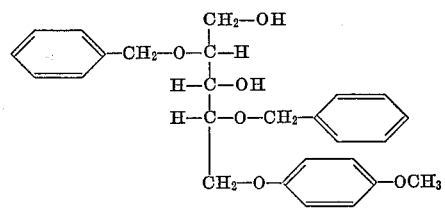

is obtained in the form of white crystals, M.P. 81–82°; $[\alpha]_D^{20}=-35°\pm1°$ (c.=1.150 in chloroform).

The starting material can be prepared as follows:

At 110° 6 drops of pyridine are added to a melt of 50 g. of 1,2 - O - isopropylidene-5,6-anhydro-α-D-glucofuranose and 30.7 g. of 4-methoxyphenol. By cooling, the exothermic reaction is kept at a temperature not exceeding 170°. The mixture is stirred at 140° for 30 minutes, then cooled to 80–90° with continued stirring, and 100 ml. of methanol are then added. The bulk of the methanol is distilled off and the mixture is extracted with ether. The ether solution is washed with a 1 N aqueous sodium hydroxide solution and with water, dried over sodium sulfate, and evaporated under reduced pressure. The resulting 1,2 - O-isopropylidene-6-O-(4-methoxyphenyl)-α-D-glucofuranose is purified as follows:

A mixture of 72 g. of the crude product in a mixture of 144 ml. of pyridine and 144 ml. of acetic acid anhydride is allowed to stand at room temperature for 12 hours. Then the mixture of pyridine and acetic acid anhydride is distilled off under reduced pressure at 60–70°. The residue is distilled in a high vacuum.

The 1,2-O-isopropylidene-3,5-di-O-acetyl-6-O-(4 - methoxyphenyl) - α - D-glucofuranose is obtained at 210°/0.02 mm. Hg and is crystallized from a mixture of methanol and water, M.P. 90.5–92°; $[\alpha]_D^{20}=-12°\pm1°$ (c.=1.161 in chloroform).

A suspension of 69.3 g. of 1,2-O-isopropylidene-3,5-di-O-acetyl-6-O-(4-methoxyphenyl) - α-D - glucofuranose in 360 ml. of methanol is mixed with a solution of 20.6 g. of potassium hydroxide in 150 ml. of methanol. The mixture is stirred at room temperature for 30 minutes, then evaporated at 40° in a water-jet vacuum, and extracted with ether. The ether solution is washed with water, dried over sodium sulfate and evaporated under reduced pressure. The pure 1,2-O-isopropylidene-6-O-(4-methoxyphenyl)-α-D-glucofuranose obtained as the residue is degassed in a high vacuum; $[\alpha]_D^{20}=+3°\pm1°$ (c.=1.004 in chloroform).

A solution of 56 g. of 1,2-O-isopropylidene-6-O-(4-methoxyphenyl)-α-D-glucofuranose in 90 ml. of dimethylsulfoxide is stirred dropwise, in an atmosphere of nitrogen, to a suspension of 31.8 g. of powdered potassium hydroxide in 60 ml. of dimethylsulfoxide. After that, 65.4 g. benzyl chloride are added dropwise in the course of 75 minutes at 40°. The reaction mixture is stirred for 2 hours, then poured into 100 ml. of ice-water and the whole is extracted with chloroform. The chloroform solution is washed with water, dried over sodium sulfate and evaporated in a water-jet vacuum. The residue is distilled in the high vacuum under a pressure of 0.05 mm. Hg until the vapor temperature reaches 200°. The crude 1,2-O-isopropylidene-3,5-di-O-benzyl-6-O-(4 - methoxyphenyl)-α-D-glucofuranose obtained as the residue is processed without further purification.

A solution of 79 g. of 1,2-O-isopropylidene-3,5-di-O-benzyl-6-O-(4-methoxyphenyl) - α-D - glucofuranose in 1200 ml. of 1 N ethanolic hydrogen chloride is allowed to stand at room temperature for 17 hours. The mixture is then cooled to 0–5° and neutralized with an ice-cold 10 N aqueous sodium hydroxide solution. At 40° and under reduced pressure, the bulk of the ethanol is distilled off and the concentrate is extracted with ether. The ether solution is washed with a saturated aqueous sodium hydrogen sulfite solution and with water, dried over sodium sulfate, and evaporated at 40° in a water-jet vacuum. On degassing in a high vacuum, ethyl-3,5-di-O-benzyl-6-O-(4-methoxyphenyl)-D-glucofuranoside is obtained as a yellowish oil; $[\alpha]_D^{20} = -72° \pm 10$ (c.=1.069 in chloroform).

A solution of 60 g. of ethyl-3,5-di-O-benzyl-6-O-(4-methoxyphenyl)-D-glucofuranoside in 3000 ml. of 50% aqueous acetic acid is stirred at 70° for 5 hours. After that, the bulk of the acetic acid is distilled off under reduced pressure at 60–70° and the residue is extracted with ether. The ether solution is washed with a saturated aqueous sodium hydrogen carbonate solution and with water, dried over sodium sulfate and evaporated in a water-jet vacuum. The 3,5-di-O-benzyl-6-O-(4-methoxyphenyl)-D-glucofuranose crystallizes in the form of white crystals from a mixture of ether and petroleum ether, M.P. 99–100°; $[\alpha]_D^{20} = -7° \pm 1°$ (c.=1.228 in chloroform).

A solution of 30.3 g. of 3,5-di-O-benzyl-6-O-4-methoxyphenyl)-D-glucofuranose in 400 ml. of 65% aqueous acetic acid is mixed at 20° with a solution of 32.1 g. of periodic acid in 70 ml. of water. The resulting white, crystalline precipitate is filtered off and washed with a small amount of ice-water, then dried at 30° in a water-jet vacuum. The resulting 2,4-di-O-benzyl-3-O-formyl-5-O-(4-methoxyphenyl)-D-arabinose melts at 74–75°;

$$[\alpha]_D^{20} = +8° \pm 1°$$

(c.=1.251 in chloroform).

EXAMPLE 8

A solution of 18.5 g. of 2-O-allyl-3-O-formyl-4,5-di-O-benzyl-D-arabinose in 200 ml. of methanol is added dropwise in the course of 30 minutes at 10° to a solution of 6 g. of sodium borohydride in 200 ml. of 85% aqueous methanol. The mixture is stirred for 30 minutes at 10° and the bulk of the methanol then distilled off at 40° under reduced pressure. After the addition of 100 ml. of water, the residue is extracted with ether. The ether solution is washed with ice-cold 2 N hydrochloric acid and with water, dried over sodium sulfate, and evaporated in a water-jet vacuum. On degassing in a high vacuum 2-O-allyl-4,5-di-O-benzyl-D-arabitol of the formula

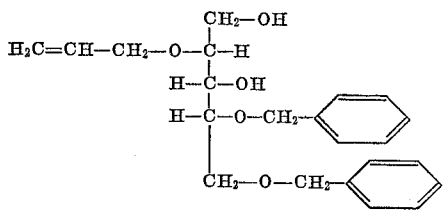

is obtained as a colourless oil, B.P. 220°/0.008 mm. Hg (microdistillation); $[\alpha]_D^{20} = -37° \pm 1°$ (c.=0.895 in chloroform).

The starting material can be prepared as follows:

A suspension, prepared in an atmosphere of nitrogen, of 121 g. of powdered potassium hydroxide in 300 ml. of dimethylsulfoxide is mixed with a solution of 214 g. of 1,2-isopropylidene-3-O-allyl-α-D-glucofuranose in 500 ml. of dimethylsulfoxide and the mixture is treated dropwise in the course of 3 hours under nitrogen with 227.2 g. of benzyl chloride in such manner that the temperature does not rise above 40–45°. The mixture is stirred for another hour at 40° and then poured into 1500 ml. of ice-water and extracted with ether. The ether extract is washed with water, dried over sodium sulfate, and evaporated. The residue is distilled and the 1,2-O-isopropylidene-3-O-allyl-5,6-di-O-benzyl-α-D-glucofuranose is obtained at 192–198°/0.01 mm. Hg; $[\alpha]_D^2 = -30° \pm 0.5°$ (c.=1.993 in chloroform).

A solution of 12.75 g. of 1,2-O-isopropylidene-3-O-allyl-5,6-di-O-benzyl-α-D-glucofuranose in 298 ml. of a 1 N ethanolic solution of hydrogen chloride is kept for 17 hours at room temperature and then neutralized at 0° to 5° with a 10 N aqueous sodium hydroxide solution. The bulk of ethanol is distilled off under reduced pressure and the residue is extracted with chloroform. The chloroform extract is washed with a saturated sodium bisulfite solution and with water, dried over sodium sulfate and evaporated under reduced pressure. The residue is distilled and yields at 200°/0.03 mm. Hg the ethyl-3-O-allyl-5,6-di-O-benzyl-D-glucofuranoside as a faintly yellowish oil; $[\alpha]_D^{20} = -18° \pm 1°$ (c.=1 in chloroform).

A solution of 277 g. of ethyl-3-O-allyl-5,6-di-O-benzyl-D-glucofuranoside in 4500 ml. of 55% aqueous acetic acid is stirred for 6 hours at 70°. After that, the bulk of the acetic acid is distilled off under reduced pressure at 60–70°. The residue is neutralized at 0–5° with ice-cold 10 N aqueous sodium hydroxide and extracted with ether. The ether solution is washed with water, dried over sodium sulfate and evaporated at 40° in a water-jet vacuum. From a mixture of ether and petroleum ether, the 3-O-allyl-5,6-di-O-benzyl-D-glucofuranose crystallizes in the form of white crystals, M.P. 58–59°; $[\alpha]_D^{20} = -19° \pm 1°$ (c.=1.013 in chloroform).

A solution of 30 g. of 3-O-allyl-5,6-di-O-benzyl-D-glucofuranose in 530 ml. of 57% aqueous acetic acid is mixed at 20° with a solution of 37.4 g. of periodic acid in 70 ml. of water. The reaction mixture is then diluted with 550 ml. of water and extracted with ether. The ether solution is washed with a saturated sodium hydrogen carbonate solution and with water, dried over sodium sulfate, and evaporated at 30° under reduced pressure. The 2-O-allyl-3-O-formyl-5,6-di-O-benzyl-D-arabinose is obtained in the form of white, deliquescent crystals, M.P. 47–49°.

EXAMPLE 9

A solution of 1 g. of 1,3-O-benzylidene-2,4,5-tri-O-benzyl-D-arabitol in 10 ml. of dioxan is treated with 5 ml. of concentrated hydrochloric acid and allowed to stand at 20° for 4 hours. The bulk of dioxan and hydrochloric acid is then distilled off under reduced pressure and at a temperature of 40°. The residue is neutralized at 0–5° with a 10 N aqueous sodium hydroxide solution and extracted with ether; the ether solution is dried over sodium sulfate and evaporated under reduced pressure. Using preparative thin layer chromatography (silica gel PF 254 of Merck AG, Darmstadt; system: chloroform-ethyl acetate 85:15), the pure 2,4,5-tri-O-benzyl-D-arabitol is obtained in the form of white needles, $Rf=0.2$; F. 66.5–67.5°.

The starting material may be obtained by reacting 1,2-O-isopropylidene-3-O-benzyl-α-D-glucofuranose with 2 moles of benzyl chloride in pyridine and treating the resulting 1,2-O-isopropylidene-3-O-benzyl-5,6-di-O-benzoyl-α-D-glucofuranose with a 10% solution of dry hydrogen chloride in absolute ethanol for 16 hours. The resulting ethyl-3-O-benzyl-5,6-di-O-benzoyl-D - glucofuranoside in 50% aqueous acetic acid is heated at 60° and the resulting 3-O-benzyl-5,6-di-O-benzoyl - D - glucofuranose in acetic acid is degradated with periodic acid according to the procedure described in Example 1 to form the 2-O-benzyl-3-O-formyl-4,5-di-O-benzoyl-D-arabinose. A solution of the product is methanol is treated at 10–20° with sodium borohydride and the resulting 2-O-benzyl-4,5-di-O-benzoyl-D-arabitol is treated with benzaldehyde in the presence of zinc chloride to yield the 1,3-O-benzylidene-2-O-benzyl - 4,5-di-O-benzoyl-D-arabitol, which is hydrolized by treatment with a aqueous ethanolic sodium hydroxide solution. The 1,3 - O - benzylidene-2-O-benzyl-D-arabitol thus obtained is dissolved in dioxan and treated with benzyl chloride in the presence of powdered potassium hydroxide; the resulting 1,3-O-benzylidene-2,4,5-tri-O-benzyl-D-arabitol melts at 143–144° after recrystallization from ethanol; thin layer chromatogram: $Rf=0.75$ (silica gel SL 254 of Merck AG, Darmstadt; system: chloroform-ethyl acetate 85:15).

EXAMPLE 10

A solution of 1 g. of 1,3-O-benzylidene-2-O-n-propyl-4,5-di-O-(4-chlorobenzyl)-D-arabitol in 40 ml. of 75% aqueous acetic acid is allowed to stand for 12 hours at 70°. The bulk of the acetic acid is removed under water-jet vacuum and the residue is neutralized at 0–5° with a 10 N aqueous sodium hydroxide solution, then extracted with ether. The ether solution is washed with water, dried over sodium sulfate and evaporated under reduced pressure. The residue is subjected to preparative thin layer chromatgraphy (silica gel P$f$ 254 of Merck AG, Darmstadt; system: chloroform-ethyl acetate 85:15). The pure 2-O-n-propyl-4,5-di-O-(4-chlorobenzyl)-D-arabitol is obtained in the form of white crystals, M.P. 84°; thin layer chromatogram: $Rf=0.13$ (silica gel SL 254 of Merck AG, Darmstadt; system: chloroform-ethyl acetate 85:15).

The starting material is obtained according to the procedure described in Example 9 by selecting the appropriate starting materials; the 1,3-O-benzylidene-2-O-n-propyl-4,5-di-O-(4-chlorobenzyl)-D-arabitol melts at 132–133° after recrystallization from a mixture of acetone and petroleum ether; $Rf=0.7$ (silica gel SL 254 of Merck AG, Darmstadt; system: chloroform-ethyl acetate 85:15).

EXAMPLE 11

Capsules containing 0.4 g. of the active substance can be manufactured as follows:

Composition (for 10000 capsules): G.
2,4,5-tri-O-benzyl-D-arabitol _____ 4000
Absolute ethanol _____ 400

The 2,4,5-tri-O-benzyl-D-arabitol is mixed with the ethanol and the mixture is filled into soft gelatine capsules with the aid of a suitable capsule machine. Instead of the 2,4,5-tri - O - benzyl - D - arabitol, the 2-O-n-propyl-4,5-di-O-(4-chlorobenzyl)-D-arabitol or the 2,4-di-O-benzyl-5-O-phenyl-D-arabitol may be used in the above example.

EXAMPLE 12

Tablets containing 0.2 g. of the active substance can be manufactured as follows:

Composition (for 10000 tablets): G.
2,4,5-tri-O-benzyl-D-arabitol _____ 2000
Magnesium trisilicate _____ 1000
Wheat starch _____ 1350
Polyvinylpyrrolidone _____ 200
Colloidal silica _____ 250
Talc _____ 150
Magnesium stearate _____ 50

The 2,4,5-tri-O-benzyl-D-arabitol is mixed with the magnesium trisilicate, a part of the wheat starch and the colloidal silica and the sieved mixture is moistened with a solution of polyvinylpyrrolidone in methylene chloride until a slightly plastic mass has been produced. This is forced through a sieve and dried; the granules are again sieved. The remainder of the wheat starch, the talc and the magnesium stearate are mixed in and the mixture is processed into tablets weighing 0.5 g. Instead of the 2,4,5-tri-O-benzyl - D - arabitol, the 2-O-n-propyl-4,5-di-O-(4-chlorobenzyl) - D - arabitol or the 2,4-di-O-arabitol may be used to manufacture the above-mentioned tablets.

What is claimed is:

1. A member selected from the group consisting of D-arabitol compounds of the formula

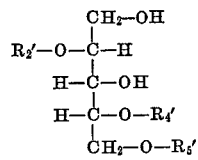

in which $R_2'$ is a member selected from the group consisting of lower alkyl, lower alkenyl, benzyl and benzyl substituted by a member selected from the group consisting of halogeno, lower alkyl and lower alkoxy, $R_4'$ is a member selected from the group consisting of benzyl and benzyl substituted by a member selected from the group consisting of halogeno, lower alkyl and lower alkoxy, and $R_5'$ is benzyl, benzyl substituted by a member selected from the group consisting of halogeno, lower alkyl and lower alkoxy, phenyl and phenyl substituted by a member selected from the group consisting of halogeno, lower alkyl and lower alkoxy.

2. D-arabitol compounds as shown in claim 1 in which $R_2'$ is a member selected from the group consisting of lower alkyl, benzyl, and benzyl substituted by a member selected from the group consisting of chloro, methyl and methoxy, $R_4'$ represents a member selected from the group consisting of benzyl and benzyl substituted by a member selected from the group consisting of chloro, methyl and methoxy, and $R_5'$ is a member selected from the group consisting of benzyl, benzyl substituted by a member selected from the group consisting of chloro, methyl and methoxy, phenyl and phenyl substituted by a member selected from the group consisting of chloro, methyl and methoxy.

3. D-arabitol compounds as shown in claim 1 in which $R_2'$ is a member selected from the group consisting of lower alkyl, benzyl and benzyl substituted in 4-position by a member selected from the group consisting of chloro, methyl and methoxy, $R_4'$ is a member selected from the group consisting of benzyl and benzyl substituted in 4-position by a member selected from the group consisting of chloro, methyl and methoxy, and $R_5'$ is a member selected from the group consisting of benzyl, benzyl substituted in 4-position by a member selected from the group consisting of chloro, methyl and methoxy, phenyl, and phenyl substituted in 4-position by a member selected from the group consisting of chloro, methyl and methoxy.

4. A compound as claimed in claim 1 and being 2,4,5-tri-O-benzyl-D-arabitol.

5. A compound as claimed in claim 1 and being 2-O-n-propyl-4,5-di-O-(4-chlorobenzyl)-D-arabitol.

6. A compound as claimed in claim 1 and being 2-O-methyl-4,5-di-O-(4-chlorobenzyl)-D-arabitol.

7. A compound as claimed in claim 1 and being 2,4-di-O-benzyl-5-O-phenyl-D-arabitol.

8. A compound as claimed in claim 1 and being 2,4-di-O-benzyl-5-O-(4-chlorophenyl)-D-arabitol.

9. A compound as claimed in claim 1 and being 2,4-di-O-benzyl-5-O-(4-methoxyphenyl)-D-arabitol.

10. A compound as claimed in claim 1 and being 2-O-allyl-4,5-di-O-benzyl-D-arabitol.

References Cited

UNITED STATES PATENTS

| | | | |
|---|---|---|---|
| 1,936,093 | 11/1933 | Lawson | 260—611 A |
| 2,106,188 | 1/1938 | Power et al. | 260—615 R UX |
| 2,218,568 | 10/1940 | White | 260—615 R |
| 2,235,785 | 3/1941 | White | 260—613 RX |
| 3,048,577 | 8/1962 | Gaertner | 260—611 AX |
| 3,219,688 | 11/1965 | Weil et al. | 260—611 AX |
| 3,331,678 | 7/1967 | Chappelow | 260—611 AX |
| 3,474,148 | 10/1969 | Carpenter et al. | 260—615 R |

BERNARD HELFIN, Primary Examiner

U.S. Cl. X.R.

260—611 R, 609 F, 613 D, 613 R, 209 R, 346.1 R, 488 J, 340.9, 999; 424—339